United States Patent Office 3,089,542
Patented May 14, 1963

3,089,542
OIL WELL FRACTURING METHOD
Edwin R. Kolodny, Stamford, Conn., assignor to American Cyanamid Company, New York, N.Y., a corporation of Maine
No Drawing. Filed Apr. 13, 1960, Ser. No. 21,865
4 Claims. (Cl. 166—42)

The present invention relates to a method of fracturing subterranean formations to increase oil production therefrom and more particularly, to the use of novel propping agents in such a process.

In the recovery of oil in oil well drilling operations, frequently zones are reached in subterranean areas that are not producing a flow of oil to the well equal to its capacity. While such areas are sometimes found at depths of less than 5,000 feet, more frequently they are found in the deeper wells, that is, wells having a depth of at least 5,000 feet and usually depths of from between 7,000 and 25,000 feet. In order to increase the flow of oil to the well bore, it has become fairly common practice to fracture the subterranean formation and by so doing, to produce fissures and crevices in the formations about the well bore which permit the oil to flow thereto in increased volume.

Normally, in such fracturing operations, sand is dispersed in a thickened hydrocarbon, although frequently water is used and the mixture is pumped down the well into the subterranean formations under sufficient pressure to cause the formation to fracture.

The function of the sand in the carrier medium as for example, the hydrocarbon or water, is to deposit in the cracks and fissures, thereby keeping them open and allowing the oil to flow freely to the well bore. In fracturing operations of the type generally described above, the sand is referred to as a propping agent in that in essence, its function is to prevent the closure of the fissures and cracks (prop open) produced in the subterranean land formations by the action of the hydrocarbon or water carrier under extreme pressure.

In general, a description of oil well fracturing and some of the considerations involved are set forth in the article "Why Should I Fracture My Well . . . and How" which appears in the "Oil and Gas Journal" in the issue of January 11, 1957.

As noted above, in oil well fracturing as it is carried out today, the best known propping agent is sand. The sand normally employed is described as Ottawa 20–60 mesh sand and more frequently the 20–40 mesh size is employed. Sand as a propping agent has the important advantage of being comparatively inexpensive. However, sand as a propping agent has many deficiencies. Thus, sand as a propping agent in fracturing of deep wells, that is, wells having a depth greater than 5,000 feet is very frequently crushed, thus destroying its propping function. Further, when sand is crushed, it normally breaks into a multiplicity of extremely fine pieces as distinguished from comparatively large fragments and, thus, virtually, no propping action is to be found in the residue. Additionally, sand is a comparatively dense material and as such is comparatively difficult to suspend in the fracturing fluid as, for example, the hydrocarbon fluid or water. One of the principal disadvantages of sand as a propping agent is that it is difficult to get sand which is effective as a propping agent in varying sizes. Thus, the more typical Ottawa 20–40 mesh size is actually most widely employed in that sand of this size is characterized by a generally rounded configuration. As sand particle sizes increase, as for example, from between about 2 and 20 mesh, the particles become more angular, tend to fracture more readily, and are characterized by a tendency to "bridge" or form blocks near or at the entrance to the cracks and fissures rather than packing them fully as is desirable for maximum effectiveness.

Accordingly, it is an object of the present invention to provide a method of fracturing subterranean formations in which a propping agent is employed which has a markedly greater crush resistance than sand and is further characterized by the ability to pancake or yield under great pressures. This ability to pancake or yield under great pressures results in the proposed propping agents being extremely difficult to fracture and additionally, imparts resistance to embedment in the formation.

It is a further object of the present invention to provide a propping agent which when fractured under great pressures fractures into comparatively large particles, thereby resulting in a residual propping action.

It is a further object of the present invention to provide a propping agent which may be readily and economically prepared over a wide range of particle sizes and still be characterized by the desirable physical properties essential for effective propping agents.

A still further object of the present invention is to provide a propping agent which has a lower density than that of sand and therefore may be more readily suspended in the fracturing fluid and which, because of its lower density can for a lower quantum of material on a weight basis accomplish substantially the same job as that of sand.

Other objects and advantages of the present invention will become more apparent from the detailed description thereof set forth hereinbelow.

In accordance with the present invention, a method of fracturing subterranean formations is provided whereby the flow of oil to a well bore is increased in which a fracturing fluid is pumped down the well into the formation under sufficient pressure to cause the formation to fracture in which a novel propping agent is incorporated into the said fracturing fluid.

The novel propping agents of the instant invention are thermoset resinous beads characterized by a substantially uniform spherical configuration and a particle size within the range of between about 2 and about 60 mesh and by a density in excess of the density of the fracturing fluid employed in a particular fracturing method.

The spherical thermoset resin beads may be made from certain thermosetting resinous materials known in the resin arts. Thus, for example, these beads may be made from polyester resin and cross-linked styrene. For example in the field of cross-linked styrene, I contemplate thermosetting compositions comprising styrene (or substituted styrenes) as the major component blended with cross-linking agents such as divinylbenzene, vinyl acrylates or methacrylates, and the like, in amounts of 5–30% of said composition. Of the thermoset resin beads contemplated, beads prepared from polyester resins are greatly preferred in that it is comparatively easy to form beads of these resins which are substantially uniformly spherical and which are characterized by the other desirable properties of the propping agents prepared in accordance with this invention. The polyester resins in general are those resins prepared by reacting a polyhydric alcohol with carboxylic acid which may or may not be modified with plasticizers or cross linking agents as for example, the styrenes. Thus, for example, such resins may be prepared by reacting suitable polyhydric alcohols such as ethylene glycol, propylene glycol, and butylene glycol and the like, with such polybasic acids or their anhydrides as maleic acid, fumaric acid, itaconic acid, citraconic acid and the like. As indicated above, these reaction products may be further modified by a reaction with various vinyl compounds such as coumaron, indene, vinyl acetate, vinyl chloride, butadiene, isobutylene, chloroprene, various vinyl esters, including acrylic esters, methylacrylic esters, vinyl ketones, the styrenes including o-, m-p-methylstyrene, alpha methylstyrene, 2,4-dimethylstyrene and the like. These resins are well-known and are described in such United States Patents as United States Patent Number 2,255,313, and United States Patent Numbers 2,443,735–741.

The propping agents or beads of this invention are normally prepared by suspension polymerization. The resin solution containing a free radical producer is dispersed as droplets in water containing a suspending agent. Benzoyl peroxide, methylethylketone hydroperoxide, p-methane hydroperoxide, and the like may be employed as the free radical producers to cure the resins. Curing of the resins in bead form is achieved by heating the dispersed system to the temperature required for the thermal breakdown and free radical generation. Redox catalysts may be used to cause curing at lower temperatures, as for example peroxide-iron, hydroperoxide-dialkylaniline persulfate-amine, and the like. Curing may also be accomplished by radiation, photo initiation and the like.

To prevent agglomeration of the beads prior to curing, gelatin, glue, starch, polyvinyl alcohol, polyacrylamide, casein and other materials normally characterized as protective colloids may be employed.

The compressibility and heat distortion properties of the beads may be altered as desired. Normally, the greater the degree of unsaturation of the resin, the less compressible it will be. Additionally, the polyester may be mixed with divinyl monomers for higher density cross-linking and hence still less compressibility. Thus, divinyl benzene, vinylmethacrylate, diallyl melamine are examples of such compounds. Triallylcyanurate is an example of a monomer which will improve the heat distortion properties of the cured resins.

These and others suggested variations and modifications of suitable bead forming resins and preferably suitable bead forming polyester resins are for the most part well known to those skilled in the arts and are referred to in the patents identified hereinabove.

It should be noted that the thermosetting resins employed in preparing propping agents of this invention may be employed singularly or in combination with one another where compatible.

The terms, "thermoset resinous bead" and "thermoset resinous propping agent" as they are employed herein refer to propping agents that retain essentially the properties of the thermoset resin employed. Thus, these propping agents may be prepared from resinous materials containing extenders such as clays and other siliceous materials including crushed sand, sawdust, talc, cellulose and the like.

It should be noted that in the process of this invention, physical mixtures of the thermoset resinous beads and other known propping agents such as sand are fully contemplated.

By the expression, "substantially uniformly spherical" and other similar expressions as they are employed herein, it is meant that the thermoset resinous propping agents have a bead-like configuration, i.e., they are rounded or substantially round.

The fact that the thermoset resin propping agents may be prepared over a wide range of particle sizes is one of the advantages of the instant invention. Thus, the propping agents of this invention may be prepared having particle sizes as large as about 2 up to as fine as 60 mesh and finer without sacrificing their desirable attributes. For most fracturing operations the beads should be from between about 2 and about 40 mesh in size and accordingly this is the preferred particle size range for the propping agents of this invention. Because of the fact that the propping agents of this invention may be prepared over a wide particle size range and still retain excellent physical properties, beads within the range of about 2 to about 20 mesh are a particularly preferred aspect of this invention.

As noted above, one of the principal attributes of the propping agents of this invention which render them more desirable than sand, the most commonly employed propping agent today, is their ability to "pancake" rather than to fracture and fragmentize under great pressures. In general, by the term "pancake" I mean that the normally uniformly spherical propping agents tend to flatten out or become elliptical in cross section when subjected to pressures.

By the expression having "a density in excess of the density of the fracturing fluid" it is meant that the thermoset resin propping agents of this invention must be more dense or heavier than the carrying or fracturing fluid in which they are employed. In addition to having a density greater than the carrier fluid, they should normally be characterized by a density of less than sand, sand having a density of 2.6. As will be readily appreciated, the reason for the propping agent having a density of greater than that of the fracturing fluids is that it must be capable of settling out in the crevices and cracks or fissures produced by the fracturing agent to be effective as a propping agent. When water is employed as the fracturing fluid, the propping agents of this invention should have a density of in excess of 1 and may range up to about 2.5 though preferably they will be characterized by a density of between about 1.1 and 2.

When the fracturing fluid is a hydrocarbon such as crude oil, kerosene and the like, which mediums normally have a density of between about 0.7 or 0.8 and 1, the propping agent of the present invention may be characterized by a density of between about 0.8 and 2.5, though preferably from between about 1 and 2.

The fact that the propping agents of this invention are normally characterized by a density substantially below that of sand has innumerable advantages. Thus, it is easier to suspend such propping agents in the fracturing fluid and minimizes or removes entirely the need for thickening agents such as fatty acid soaps and various gums such as gum tragacanth, guar gum, gum ghatti and the like, the usual thickening agents and suspending agents employed in fracturing operations today. Additionally it will be seen that the employment of propping agents of this invention characterized by densities of less than half of propping agent normally employed on a weight basis means that less than half the propping agent on a weight basis is required to do a given job.

In the preparation of a fracturing fluid in accordance with this invention, the propping agents or beads normally in an amount of from between about 0.5 and about 3 lbs. per gallon based on the total volume of fracturing fluid are added to such fluid and to the extent that stability or suspension of the propping agents is required, suitable thickening agents may be employed. In a normal fracturing operation or treatment from between about 2000 and 10,000 of gallons of fluid are forced down the well bore, the bit having been removed under pressures which vary depending upon the formation of the earth strata, depth of well and other variables known to those skilled in the art. When a subterranean formation has been fractured, the fracturing fluid containing the suspended propping agents or beads flow into the fissures or crevices, the propping agents settling out of the fracturing fluid to perform their propping function.

In order to demonstrate certain of the important characteristics of the propping agents of this invention such as their crush strength, resistance to acid, degradation, stability to heat and the like, the following examples are given by way of illustration. No details or enumerations contained therein should be construed as limitations on the present invention except insofar as they appear in the appended claims. All parts and percentages are by weight unless otherwise specifically designated.

EXAMPLE 1

19.15 parts of an alkyl resin, the condensate of molar equivalents of propylene glycol and maleic anhydride were mixed with 0.96 parts of a propylene glycol adipic acid ester plasticizer, 12.88 parts of styrene as a cross-linking agent and 0.26 parts of benzoyl peroxide as a catalyst were stirred together to form a potentially thermosetting polyester resin solution. 0.07 parts of polyvinyl alcohol were dissolved in 73.18 parts of water and heated to 90° C. Thereafter the resin solution was added to the solution of polyvinyl alcohol in a kettle equipped with a slow speed anchor type stirrer to form the beads. The amount of water in the kettle was maintained at from between 80–85° C. for two hours. Thereafter, the beads were filtered off, washed and given an additional cure in an oven for one hour at 130° C.

It is believed desirable to employ a plasticizer in the preparation of the propping beads of this invention particularly when they are prepared from polyester resins in that the plasticizer permits the beads to remain softer for longer periods of time during the curing step while entrapped gases diffuse out. Additionally, beads made without the use of plasticizers appear to contain more voids with the result that to some extent they are characterized by somewhat lower compressive strength.

To compare the compression strength of the beads of this invention with that of 20–40 mesh Ottawa propping sand, a 1.5" bed of 20–40 mesh propping agents prepared as in Example 1 were charged into a cylinder of 0.875" diameter and compressed under a piston in a Baldwin Tensile Tester at 0.05" per minute cross head speed. The sample was then removed and thoroughly riffled to obtain representative area for photomacrographs.

Ottawa propping sand, 20–40 mesh (the standard used in industry) was subjected to the same compression test and was thereafter thoroughly riffled to obtain a representative area for photomacrographs.

Additionally, the samples were also screened to determine the percent by weight passing through a 60 mesh screen after the above compression tests.

The results of this comparison are shown in Table I.

mentally predetermined to produce the size bead desired.

In about 0.5 to one hour, sufficient curing has taken place so that the beads retain their shape without stirring. They are then filtered off, washed free from the polyvinylalcohol and dried in an oven at from 100–130° C. for between 1 and 3 hours. As in Example 1 the elevated temperature provides a post-cure for the thermoset resin beads.

The beads produced in accordance with Example 2 were characterized by the outstanding compression or crush resistance of the beads prepared by Example 1.

EXAMPLE 3

In order to compare the sedimentation rates of the propping agents of this invention and those of Ottawa 20–40 mesh propping sand, 100 ccs. of the propping agent prepared as in Example 1 were added to a 500 ml. graduate of water and the time recorded to form a 50 cc. bed.

An identical test was carried out with Ottawa 20–40 mesh sand.

The sand settled out immediately. The polyester propping beads of this invention required an average of 11.5 seconds to form the 50 cc. bed.

The results of this test indicate clearly that the propping agents of this invention may be more readily suspended in fracturing fluids than that of the more dense sand.

As is well known, the deeper the penetration into the earth's surface, the higher the temperature. Thus, after several thousands of feet penetration of the earth's surface, the temperature may range from between 225° F. to as high as 400° F. within the depths normally explored in oil well drilling operations. Thus, it is important that a propping agent be capable of withstanding such temperatures. In this connection, the propping beads or agents of this invention were subjected to a 275° F. temperature for 265 hours and thereafter subjected to the compression tests described above. After being subjected to 33,000 pounds per square inch pressure, less than 1 percent of the propping agent was finer than 60 mesh.

In addition to resisting degradation by heat, a propping agent must not be degraded by a fracturing fluid as for example, crude oil, and must normally be able to withstand, or substantially resist degradation by acids which are employed in acidizing operations. Acidizing may be

*Table I*

COMPARATIVE COMPRESSION DATA

| Propping Agent | Percent by weight of propping agent smaller than 60 mesh [1] after being subjected to the indicated pound per square inch pressure | | | | | |
|---|---|---|---|---|---|---|
| | 5,000 p.s.i. | 10,000 p.s.i. | 17,000 p.s.i. | 33,000 p.s.i. | 42,000 p.s.i. | 50,000 p.s.i. |
| Ottawa Propping Sand | 0.9% | 10% | 23% | 37% | | |
| Polyester Propping Beads | 0 | 0 | Less than 1%. | Less than 1%. | Less than 1%. | Less than 1%. |

[1] U.S. Standard Sieve series.

Table I clearly demonstrates the polyester propping agents of this invention are characterized by markedly superior compression strength when compared with Ottawa propping sand, the standard in the industry.

EXAMPLE 2

300 parts of a polyester resin prepared by condensing propylene glycol, maleic anhydride, phthalic anhydride and containing 33% by weight of styrene as a cross-linking agent and ten parts of divinyl benzene are mixed to form a resin solution. 3 parts of benzoyl peroxide are then dissolved in the resin solution. The resin solution is then added to a stirred solution of polyvinyl alcohol and water having a temperature of 80° C. The total amount of water in the mixture is 1500 parts. The kettle containing the mixture has an anchor type stirrer and the speed of stirring or the rate of agitation is expericarried out as a separate operation or in conjunction with fracturing. With respect to stability in the presence of the fracturing fluid, the propping agents of this invention were maintained in crude oil for 265 hours and thereafter subjected to 33,000 pounds per square inch pressure, employing the compression test reported above. After this test was made, less than 1 percent of the propping agents were finer or would pass through a 60 mesh screen.

In many oil well drilling operations, acids are sometimes employed to dissolve out particular formations, as for example calcium formations, as well as having other divergent uses in oil well drilling operations. Accordingly, a suitable propping agent must be one that is substantially resistant to degradation by acid during the relatively short contact time normally encountered. In this connection, the propping agents of this invention were placed in 15 percent hydrochloric acid for 48 hours and thereafter subjected to 33,000 pounds per square inch pressure, employing the compression test reported above. After such tests, less than 1 percent of the propping agents were finer than 60 mesh or would pass through a 60 mesh screen.

An additional important property of the propping agents of this invention is that in a normal fracturing operation it is sometimes necessary to halt the flow of fracturing fluid down the well bore due to mechanical breakdown of the pumping apparatus, or for other reasons. When sand is employed in such fracturing fluids as the propping agent, the fracturing suspension tends to set up solid, requiring tremendous additional pumping pressure to cause it to flow properly again. Fracturing suspensions containing the propping agent of this invention are readily reconstituted after such a shutdown and in general, are freer moving and more easily handled.

I claim:

1. In a method of fracturing subterranean formations to increase the flow of oil to a well bore, in which a fracturing fluid is pumped down the well into the formation under sufficient pressure to cause the formation to fracture, the improvement which comprises the step of: incorporating into said fluid as propping agents discrete beads consisting essentially of thermoset resins selected from the class consisting of polyester resins and cross-linked styrene resins, said bead being capable of withstanding elevated pressures of at least 33,000 pounds per square inch in the absence of substantial degradation wherein less than about 1 percent of all the beads therein employed will pass through a 60 mesh screen, and further being characterized by a substantial spherical configuration, a particle size of within the range of about 2 and about 60 mesh and by a density in excess of the density of the fracturing fluid.

2. In a method of fracturing subterranean formations to increase the flow of oil to a well bore, in which water is employed as a fracturing fluid being pumped down into the formation under sufficient pressure to cause the formation to fracture, the improvement which comprises the step of: incorporating into said water as a propping agent discrete beads consisting essentially of thermoset resins selected from the class consisting of polyester resins and cross-linked styrene resins, said beads being capable of withstanding elevated pressures of at least 33,000 pounds per square inch in the absence of substantial degradation wherein less than about 1 percent of all the beads therein employed will pass through a 60 mesh screen, and further being characterized by a substantial spherical configuration, and a particle size of within the range of about 2 to 40 mesh and by a density greater than 1 but less than about 2.

3. In a method for fracturing subterranean formations to increase the flow of oil to a well bore, in which oil is employed as a fracturing fluid being pumped down into the formation under sufficient pressure to cause the formation to fracture, the improvement which comprises the step of: incorporating into said oil as a propping agent discrete beads consisting essentially of the thermoset resins selected from the class consisting of polyester resins and cross-linked styrene resins, said beads being capable of withstanding elevated pressures of at least 33,000 pounds per square inch in the absence of substantial degradation wherein less than about 1 percent of all the beads therein employed will pass through a 60 mesh screen, and further being characterized by a substantial spherical configuration and a particle size of within the range of about 2 to 40 mesh and by a density greater than 0.7 but less than 2.

4. The process according to claim 1 in which the resinous bead is prepared from a polyester resin and having a particle size within the range of about 2 to about 40 mesh and having a density in excess of that of the fracturing fluid but less than 2.

References Cited in the file of this patent

UNITED STATES PATENTS

| | | |
|---|---|---|
| 2,699,212 | Dismukes | Jan. 11, 1955 |
| 2,703,619 | Sutherlin | Mar. 8, 1955 |
| 2,950,247 | McGuire et al. | Aug. 23, 1960 |
| 2,962,095 | Morse | Nov. 29, 1960 |
| 3,026,938 | Huitt et al. | Mar. 27, 1962 |